United States Patent
Lin

(10) Patent No.: US 10,394,771 B2
(45) Date of Patent: Aug. 27, 2019

(54) USE OF SEARCH TEMPLATES TO IDENTIFY SLOW INFORMATION SERVER SEARCH PATTERNS

(75) Inventor: Ken K. Lin, West Chester, PA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1105 days.

(21) Appl. No.: 11/680,193

(22) Filed: Feb. 28, 2007

(65) Prior Publication Data

US 2008/0208804 A1 Aug. 28, 2008

(51) Int. Cl.
*G06F 17/30* (2006.01)
*G06F 16/21* (2019.01)
*G06F 16/242* (2019.01)
*G06F 16/2452* (2019.01)

(52) U.S. Cl.
CPC ........ *G06F 16/217* (2019.01); *G06F 16/2443* (2019.01); *G06F 16/24524* (2019.01)

(58) Field of Classification Search
CPC ......... G06F 17/30306; G06F 17/30415; G06F 17/30433; G06F 16/217; G06F 16/2443; G06F 16/24524
USPC .................................. 707/3–6, 10, 100, 779
See application file for complete search history.

(56) References Cited

U.S. PATENT DOCUMENTS

| | | | |
|---|---|---|---|
| 6,182,083 B1 * | 1/2001 | Scheifler et al. | |
| 6,208,986 B1 * | 3/2001 | Schneck et al. | 707/3 |
| 6,789,072 B1 * | 9/2004 | Kim et al. | 707/3 |
| 6,826,559 B1 * | 11/2004 | Ponte | 707/3 |
| 6,901,410 B2 | 5/2005 | Marron et al. | |
| 6,904,433 B2 * | 6/2005 | Kapitskaia et al. | 707/10 |
| 6,999,959 B1 * | 2/2006 | Lawrence et al. | |
| 7,010,536 B1 * | 3/2006 | De Angelo | 707/100 |
| 7,188,100 B2 * | 3/2007 | De Bellis et al. | 707/3 |
| 7,437,353 B2 * | 10/2008 | Marmaros et al. | 707/3 |
| 2005/0086204 A1 * | 4/2005 | Coiera et al. | 707/3 |
| 2005/0251513 A1 * | 11/2005 | Tenazas | 707/3 |
| 2007/0168382 A1 * | 7/2007 | Tillberg | G06F 17/30253 |
| 2008/0033919 A1 * | 2/2008 | Arrouye et al. | 707/3 |

OTHER PUBLICATIONS

"Chroniker TaskWatch—Testing Via Common User Tasks," NRG Performance Management Suite, NRG Global, <http://www.nrgglobal.com/products/taskwatch_features.php>, 2006, (last visited Feb. 1, 2007).

"OpenDS Troubleshooting Guide," Sun Microsystems Inc., <https://opends.dev.java.net/public/docs/user-docs/OpenDS-Troubleshooting.html>, 2006, (last visited Feb. 1, 2007).

Anderson, "How to Supercharge LDAP Searches with NDS eDirectory Indexes," Novell, <http://support.novell.com/techcenter/articles/ana20000705.html>, Jul. 1, 2000, (last visited Feb. 1, 2007).

* cited by examiner

*Primary Examiner* — Huawen A Peng
(74) *Attorney, Agent, or Firm* — Cuenot Forsythe & Kim, LLC

(57) ABSTRACT

Statistical information related to performing information searches based on search templates may be automatically generated and stored in statistical records. The statistical records may be automatically updated. The statistical records may be sorted to indicate which information searches are most efficient.

20 Claims, 2 Drawing Sheets

US 10,394,771 B2

USE OF SEARCH TEMPLATES TO IDENTIFY SLOW INFORMATION SERVER SEARCH PATTERNS

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Lightweight Directory Access Protocol (LDAP) is a set of protocols generally used for accessing information directories on LDAP servers. Oftentimes it is critical for certain applications be able to perform LDAP searches quickly against a target LDAP server. As the size and complexity of data stored in an information directory increases, the time required to search and retrieve data from the information directory tends to increase, however. One way to increase search efficiency is to index LDAP attributes that are searched, although in large information directories it is not practical to index all possible search attributes. Thus, system administrators typically index only those attributes that are commonly searched.

LDAP server vendors provide little direct pragmatic assistance in determining the specific search attributes that should be indexed in order to optimize search performance. Many such vendors instead describe procedures for semi-manually identifying commonly searched attributes. Such procedures typically implement logging features to record performance data on each individual search. A server administrator then can visually scan the logs to identify repeatedly slow searches, and then tune the LDAP server to improve performance for commonly used search templates. Such searches usually become hampered both by the large amounts of data storage needed to separately log each individual search and the time that is needed for logging performance data. Moreover, a high level of human intervention also is required.

SUMMARY

The embodiments of the present invention are directed to statistically tracking performance of information searches. One embodiment of the present invention can include a method of identifying efficiency of search templates that are used to retrieve information from an information source. The method can include receiving a first search request, correlating the first search request to a first search template, performing a first search in accordance with the first search request, and determining a first amount of time to complete the first search. The first amount of time can be stored in memory. The method also can include receiving a second search request, correlating the second search request to the first search template, performing a second search in accordance with the second search request, and determining a second amount of time to complete the second search. The second amount of time can be stored in memory. A first time parameter can be automatically calculated according to the first amount of time and the second amount of time. The first time parameter can indicate the search time associated with use of the first search template to perform searches to retrieve information from the information source. The method also can include indicating efficiency of the first search template according to the first time parameter. The various steps described are performed by and are executable by one or more computers.

Another embodiment of the present invention can include, in a first statistical record stored in a data storage device, automatically updating a first average search time associated with performing information searches for search requests correlating to a first search template. The method also can include, in a second statistical record stored in the data storage device, automatically updating a second average search time associated with performing information searches for search requests correlating to a second search template. The first and second statistical records can be automatically sorted based on the first and second average search times. An order of the first statistical record and the second statistical record can be indicated according to the automatic sorting. The various steps described are performed and are executable by one or more computers.

Yet another embodiment of the present invention can include a computer program product including a computer-usable medium having computer-usable code that, when executed, causes a machine to perform the various steps and/or functions described herein.

DETAILED DESCRIPTION OF THE INVENTION

Figure 1:
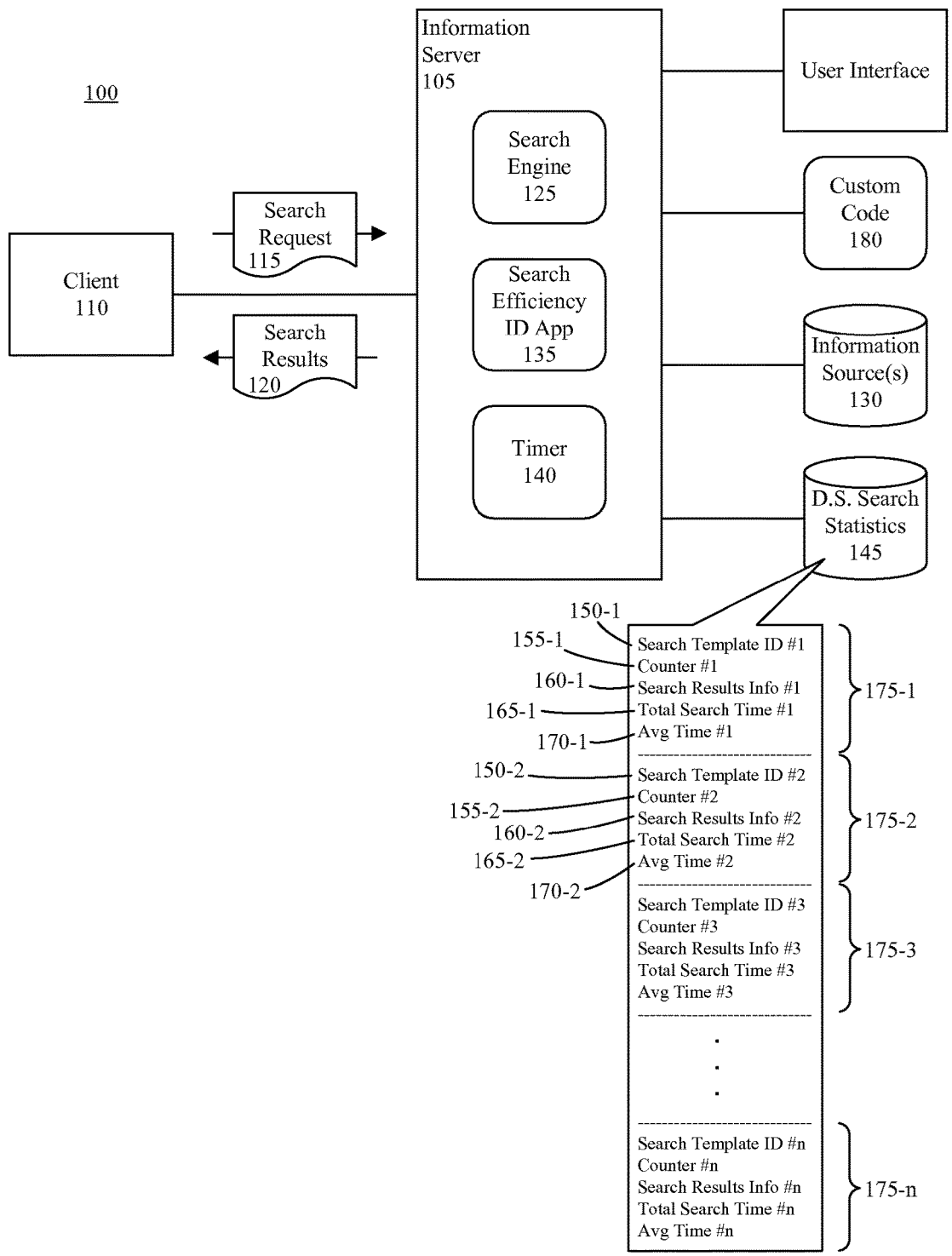
FIG. 1 is a block diagram illustrating a system in accordance with an aspect of the present invention.

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit", "module", or "system".

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. For example, the medium can include, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, an optical storage medium, such as an optical disk including a compact disk-read only memory (CD-ROM), a compact disk-read/write (CD-R/W), or a DVD, or a semiconductor or solid state memory including, but not limited to, a random access memory (RAM), a read-only memory (ROM), or an erasable programmable read-only memory (EPROM or Flash memory).

A computer-usable or computer-readable medium further can include a transmission media such as those supporting the Internet or an intranet. Further, the computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber, cable, RF, etc.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram illustrating a system 100 in accordance with an aspect of the present invention. The system 100 can include an information server 105 that receives search requests 115 from a client 110 and returns search results 120. For example, the information server 105 can include a search engine 125 that processes the search requests 115 to identify and retrieve requested information from one or more information sources 130. Search engines are well known to the skilled artisan. The information sources 130 can be data tables, databases, flat files, text files, or any other searchable information storage systems. The information sources 130 can be stored on a machine on which the information server 105 is instantiated, or stored at another location that may be accessed by the information server 105.

The information server 105 can be a Lightweight Directory Access Protocol (LDAP) server, a database server, or any other server that may process the search request 115 to access requested information from the information sources 130. In one embodiment, the information server 105 can be implemented as an IBM® Lotus® Domino® LDAP Server, an IBM® Tivoli® Directory Server or an IBM® Lotus™ Directory Server (IBM, Lotus, Domino, Tivoli and iSeries are trademarks of International Business Machines Corporation in the United States, other countries, or both). Nonetheless, the information server 105 can be implemented in any other suitable manner and the invention is not limited in this regard.

The information server 105 also can identify the efficiency of search templates that are used to generate the search requests 115. As used herein, a search template is source code into which search parameters can be inserted when generating a search request. For instance, consider the following search template example:

ldap:///o=ibm?telephonenumber?sub?(|(cn=%v)
       (mail=%v))

This search template can be used to generate the following search request examples:

ldap:///o=ibm?telephonenumber?sub?(|(cn=John Doe)
       (mail=John Doe))
    ldap:///o=ibm?telephonenumber?sub?(|
       (cn=jdoe@us.ibm.com)(mail=jdoe@us.ibm.com))

In the search request examples, various search parameters have been inserted into the example search template where indicated in the search template by "%v". It will be appreciated by one skilled in the art that a myriad of other syntaxes are known for formatting search templates and search requests, and the invention is not limited to these specific examples.

A search efficiency identification application 135 can be provided to identify efficiency of search templates that are used to retrieve information from the information source 130. The search efficiency identification application 135 can be provided as a component of the information server 105, or as a separate executable program that is communicatively linked to the information server 105.

In operation, in response to the information server 105 receiving the search information request 115, the search efficiency identification application 135 can identify a search template to which the search information request 115 correlates. For example, the search request 115, or a copy of the search request 115, can be communicated to the search efficiency identification application 135, which can parse search parameters from the search request in order to identify the search template. In another arrangement, the search efficiency identification application 135 can identify the search template by identifying terms or query commands within the search request 115. Still, the search request 115 can be processed in any other suitable manner in order to identify a corresponding search template.

The search efficiency identification application 135 also can monitor the amount of time required to complete the requested search. For instance, the search efficiency identification application 135 can initiate a timer 140 when a search based on the search request 115 is commenced. The search request can stop the timer 140 when search results are provided. To determine when to start and stop the timer 140, the search efficiency identification application 135 can monitor the search engine 125 to determine when a search commences and when a search ends. Alternatively, the timer 140 can be started and stopped at the behest of the search engine 125, or any other suitable component of the information server 105.

Search statistics corresponding to the requested search, as well as other searches, can be automatically generated and stored to a data storage 145. The search statistics also can be automatically maintained and updated in the data storage 145. The data storage 145 may comprise any suitable computer-usable or computer-readable medium. As noted, examples of such a medium can include, but is not limited to, an electronic, magnetic, optical, electromagnetic, infrared, or semiconductor system (or apparatus or device), or a propagation medium. In one arrangement, the data storage 145 can be a hash table maintained in RAM, where the keys correlate to the search templates. In addition, processes can be implemented to insure thread-safe protection of in-memory structures, for instance using semaphores.

The search statistics can include a search template identifier 150, a counter 155 and information about the search results obtained 160. The search statistics also can include time parameters, such as a total search time 165, average search time 170, and/or any other suitable search statistics. The search template identifier 150 can be any suitable identifier that corresponds to the identified search template. Examples of the search template identifier 150 can include, but are not limited to, a number, a sequence of one or more characters, a physical address or a virtual address. The counter 155 can indicate the total number of individual searches performed using the identified search template for a given monitoring period. The information about the search results obtained 160 can indicate the total number of resulting entries returned for all searches performed using the identified search template, or any other information about the search results that may be tracked. The total search time 165 can indicate the total amount of search time spent on all searches performed using the identified search template for a given monitoring period. The average search time 170 can indicate the average search time spent among the searches performed using the identified search template for a given monitoring period. For example, the value of the average search time 170 can be equal to the value of the total search time 165 divided by the value of the counter 155.

The first time a search is performed using a particular search template, a corresponding statistical record 175-1 may not yet be present. Accordingly, a new statistical record 175-1 can be generated the first time a particular search template is identified. In the new statistical record 175-1, the search template identifier 150-1 can be set to indicate the search template used in the search. Further, the counter 155-1 can be set to 1, and the information about the search results obtained 160-1 can be set to the number of entries returned in the first search. The total search time 165-1 can be set to the time determined for performance of the first search, and the average search time 170-1 also can be equal to the total search time since the counter is 1.

The statistical record 175-1 then can be updated each time another search is performed using the same search template. For example, when a next search using the search template is identified, the value of the counter 155-1 can be incremented by 1, the number of search results returned for the next search can be added to the search results information 160-1, and the total search time for the next search can be determined and added to the total search time 165-1. For instance, if the first search required 100 mS and the second search required 140 mS, the value of the total search time 165-1 can be set to 240 mS. The value of the average search time 170-1 then can be reset to reflect the new values of the total search time 165-1 and the counter 155-1.

When another search is performed using another search template not yet having a corresponding statistical record (e.g. a second search template), the statistical record 175-2 can be automatically generated using a search template identifier 150-2, a counter 155-2, search results information 160-2, total search time 165-2 determined for performance of the search, average search time 170-2, and/or any other desired information. When yet another search is performed using the second search template, the statistical record 175-2 can be automatically updated as previously described. For instance, the counter 155-2 can be incremented by 1, the number of search results returned can be added to the search results information 160-2, the total search time determined for the search can be added to the total search time 165-2, and the average search time 170-2 can be recomputed based on the new value for average search time 165-2 and the counter 155-2.

The statistical records 175 can be maintained in a sort order based on search efficiency (i.e. average search time). When any of the statistical records 175 are updated so as to change their average search time, their position in the sort order can be automatically changed, if appropriate. For instance, assume that the statistical record 175-1 initially has an average search time 170-1 that is higher than the average search time 170-2 of the statistical record 175-2. Also assume that after a particular search the average search time 170-1 becomes lower than the average search time 170-2. When this occurs, the statistical record 175-1 can be moved higher or lower in the sort order, depending on whether the statistical records are sorted from most efficient to least efficient, or from least efficient to most efficient.

In one arrangement, the total number of statistical records 175-1, 175-2, 175-3, ..., 175-n can be limited to a threshold value, thus limiting the amount of resources required to maintain the search statistics 145. The threshold value can be a default value or set by a user, such as a system administrator. When a new statistical record 175 is generated which will cause the threshold value to be exceeded, a record 175 can be disregarded (e.g. deleted, overwritten, etc.). The record 175 that is selected to be disregarded can be a record associated with a search template indicated as being most efficient, for example a search record indicating the lowest average search time. Records 175 to be disregarded can be selected in any other suitable manner and the invention is not limited in this regard.

In one aspect of the invention, the search efficiency identification application 135 can be configured to receive custom computer-usable program code 180. Such code 180 can be processed by the information server 105 to implement custom search configurations, activate special search monitoring processes, or perform any other custom processes. The custom computer-usable program code 180 can be processed in response to receiving the search request 115, but prior to a search being performed. Alternatively, the custom computer-usable program code 180 can be processed in response to an indicated event, or at a specified time.

The system 100 also can include a user interface that may be communicatively linked to the information server 105. User interfaces are well known in the art. A system administrator can interface with the information server 105 to access the search statistics 145. For example, upon request, the search statistics can be presented on a display, written to an external machine readable storage, printed onto a print medium (e.g. paper), communicated as an electronic message, an electronic packet, or electronic mail, or presented to the administrator in any other suitable manner. In another arrangement, the search statistics 145 can be polled in real time using agents, sub-agents, or polled in another suitable manner. In yet another arrangement, one or more external programs can be notified when statistics are updated, or when particular statistics of interest to the external programs are updated. Regardless of how the search statistics 145 are made accessible to a system administrator, agents, sub-agents or notifications, the statistics can be consulted to identify the slowest search patterns and a determination can be made on how to best tune either the information server 105 or the client 110.

In one aspect of the invention, the search statistics 145, or any subset of information contained in the search statistics 145, can be presented in a manner that indicates which of the search templates are less efficient than others for use in retrieving information from the information source 130. For example, the statistical records 175 can be presented in ascending or descending order based upon their sort order, average search time, or in any other suitable manner. Further, the number of statistical records 175 that are presented can be limited to a subset of all of the statistical records 175. For instance, the presentation can be limited to a user selected number of statistical records, for example statistical records associated with the twenty least efficient search templates. In another arrangement, the user can select only those statistical records which have a counter meeting a threshold value. Presentation of the statistical records can be filtered or sorted in any other suitable manner, and the invention is not limited in this regard.

Figure 2:
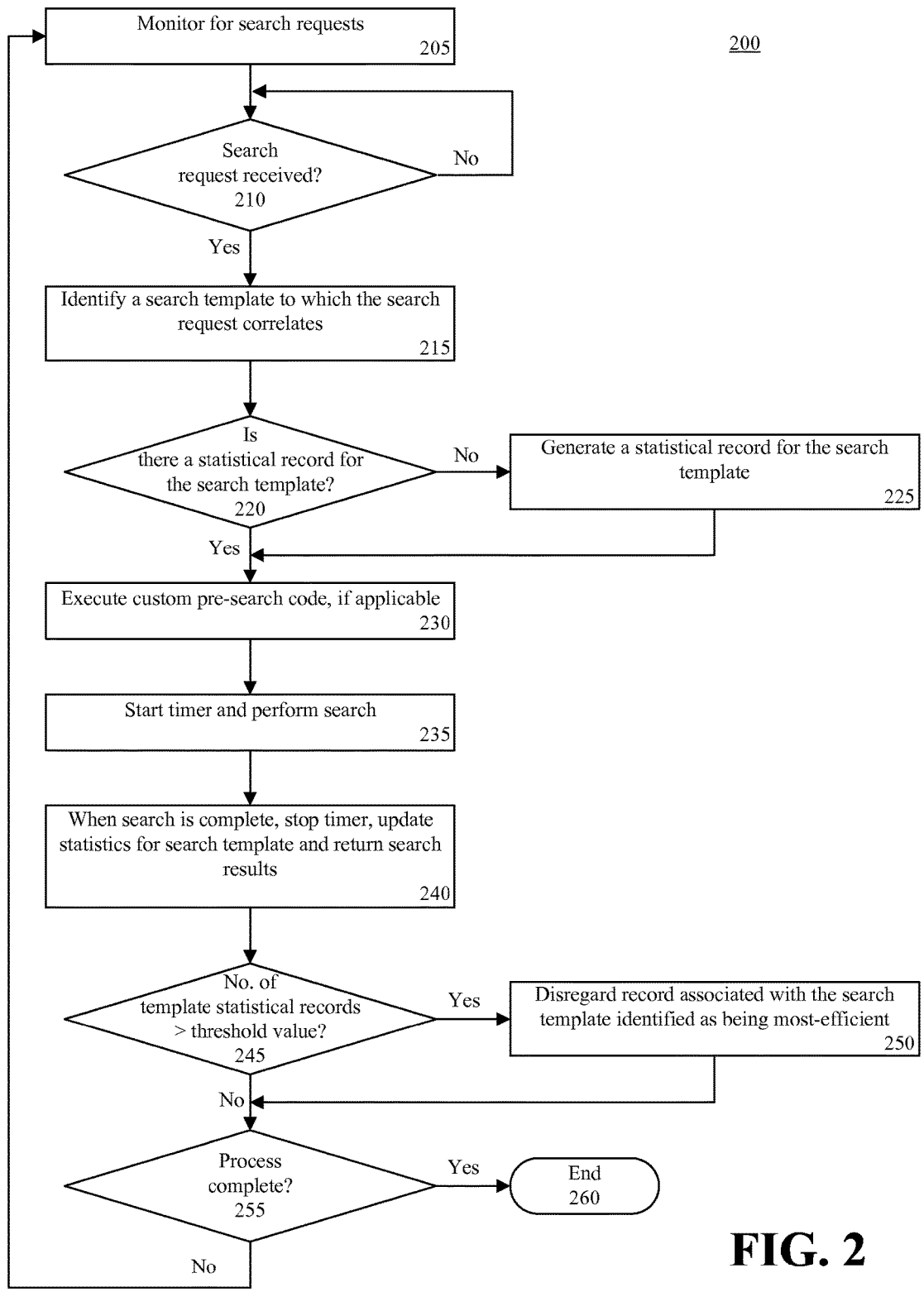
FIG. 2 is a flow chart illustrating a method of identifying efficiency of search templates that are used to retrieve information from an information source.

FIG. 2 is a flow chart illustrating a method 200 of identifying efficiency of search templates that are used to retrieve information from an information source. The method can begin in a state in which a new search template efficiency monitoring session has been initiated on an information server. Beginning at step 205, the search efficiency identification application can monitor for search requests. Referring to decision box 210, when the information server receives a search request, at step 215 a search template to which the search request correlates can be identified. Proceeding to decision box 220, if a statistical record does not already exist for the identified search template, at step 225 a new statistical record can be generated. At step 230, custom computer-usable program code can be executed, if applicable.

Continuing to step 235, a timer can be started and the requested information search can be performed. At step 240, when the search is complete, the timer can be stopped. The statistics for the search template then can be updated, as previously discussed, and the search results can be returned. Proceeding to decision box 245, if the number of search template statistical records exceeds a threshold value, at step 250 the record associated with the search template identified as being most-efficient can be disregarded.

Referring to decision box 255, if the process is complete, the process can end at step 260. Determination of whether the process is complete can be based on the number of searches performed, the elapsed time since the process was started, a user input, or in any other suitable manner. If the process is not complete, the process can return to decision box 205 and the search efficiency identification application can continue to monitor for search requests.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A computer-implemented method within an information server for identifying efficiency of search templates used to search an information source, comprising:
   receiving a first search request generated using a first search template;
   receiving a second search request different from the first search request and generated using a second search template;
   performing, using a search engine and based upon the received first search request, a first search on the information source that produces first search results;
   performing, using the search engine and based upon the received second search request, a second search on the information source that produces second search results different from the first search results;
   updating, based upon the first search results a result associated with the first search, a first statistical record associated with the first search template;
   updating, based upon the second search results a result associated with the second search, a second statistical record associated with the second search template; and
   ranking efficiency of the first and second search templates based upon the first and second statistical records, wherein
   the first statistical record includes results from a plurality of searches performed using search requests generated using with the first search template, and
   the second statistical record includes results from a plurality of searches performed using search requests generated using with the second search template, wherein
   the first search request and the second search request are separately received by the information server,
   the first statistical record includes a first search template identifier that identifies the first search template,
   the second statistical record includes a second search identifier that identifies the second search template.

2. The method of claim 1, wherein
   a statistical record associated with a search template identified as being most efficient is deleted responsive to a total number of statistical records exceeding a threshold value.

3. The method of claim 2, wherein
   the search template identified as being most efficient is based upon a lowest average search time.

4. The method of claim 1, wherein
   the information server is a lightweight directory access protocol (LDAP) server.

5. The method of claim 4, wherein
   the LDAP server is tuned based upon the first and second statistical records.

6. The method of claim 1, wherein
   the results are based upon search time.

7. The method of claim 1, wherein
   the first and second statistical records each include a number of searches performed using the search template respectively associated with the first and second statistical records.

8. The method of claim 1, wherein
   a statistical record associated with a most-efficient search template is disregarded upon a number of statistical records exceeding a threshold.

9. An information server configured to identify efficiency of search templates used to search an information source, comprising:
   one or more hardware processors, wherein the one or more hardware processors are configured to initiate and/or perform:
   receiving a first search request generated using a first search template;
   receiving a second search request different from the first search request and generated using a second search template;
   performing, using a search engine and based upon the received first search request, a first search on the information source that produces first search results;
   performing, using the search engine and based upon the received second search request, a second search on the information source that produces second search results different from the first search results;
   updating, based upon the first search results a result associated with the first search, a first statistical record associated with the first search template;
   updating, based upon the second search results a result associated with the second search, a second statistical record associated with the second search template; and
   ranking efficiency of the first and second search templates based upon the first and second statistical records, wherein
   the first statistical record includes results from a plurality of searches performed using search requests generated using with the first search template, and
   the second statistical record includes results from a plurality of searches performed using search requests generated using with the second search template, wherein
   the first search request and the second search request are separately received by the information server,
   the first statistical record includes a first search template identifier that identifies the first search template,
   the second statistical record includes a second search identifier that identifies the second search template.

10. The information server of claim 9, wherein
    a statistical record associated with a search template identified as being most efficient is deleted responsive to a total number of statistical records exceeding a threshold value.

11. The information server of claim 10, wherein
    the search template identified as being most efficient is based upon a lowest average search time.

12. The information server of claim 9, wherein
    the information server is a lightweight directory access protocol (LDAP) server.

13. The information server of claim 12, wherein
the LDAP server is tuned based upon the first and second statistical records.

14. The information server of claim 9, wherein
the results are based upon search time.

15. A computer program product, comprising:
a computer-readable storage device having stored therein computer-readable program instructions to identify efficiency of search templates used to search an information source
the computer-readable program instructions, which when executed by an information server, causes the information server to perform:
receiving a first search request generated using a first search template;
receiving a second search request different from the first search request and generated using a second search template;
performing, using a search engine and based upon the received first search request, a first search on the information source that produces first search results;
performing, using the search engine and based upon the received second search request, a second search on the information source that produces second search results different from the first search results;
updating, based upon the first search results a result associated with the first search, a first statistical record associated with the first search template;
updating, based upon the second search results a result associated with the second search, a second statistical record associated with the second search template; and
ranking efficiency of the first and second search templates based upon the first and second statistical records, wherein
the first statistical record includes results from a plurality of searches performed using search requests generated using with the first search template, and
the second statistical record includes results from a plurality of searches performed using search requests generated using with the second search template, wherein
the first search request and the second search request are separately received by the information server,
the first statistical record includes a first search template identifier that identifies the first search template,
the second statistical record includes a second search identifier that identifies the second search template.

16. The computer program product of claim 15, wherein
a statistical record associated with a search template identified as being most efficient is deleted responsive to a total number of statistical records exceeding a threshold value.

17. The computer program product of claim 16, wherein
the search template identified as being most efficient is based upon a lowest average search time.

18. The computer program product of claim 15, wherein
the computer program product is a lightweight directory access protocol (LDAP) server.

19. The computer program product of claim 18, wherein
the LDAP server is tuned based upon the first and second statistical records.

20. The computer program product of claim 15, wherein
the results are based upon search time.

* * * * *